United States Patent
Chao

(10) Patent No.: US 9,256,252 B2
(45) Date of Patent: Feb. 9, 2016

(54) MOBILE DEVICE PROTECTING STRUCTURE

(71) Applicant: GETAC TECHNOLOGY CORPORATION, Hsinchu County (TW)

(72) Inventor: Po-Tsun Chao, Taipei (TW)

(73) Assignee: Getac Technology Corporation, Hsinchu County (TW)

(*) Notice: Subject to any disclaimer, the term of this patent is extended or adjusted under 35 U.S.C. 154(b) by 143 days.

(21) Appl. No.: 14/287,120

(22) Filed: May 26, 2014

(65) Prior Publication Data

US 2015/0171912 A1    Jun. 18, 2015

Related U.S. Application Data

(60) Provisional application No. 61/917,284, filed on Dec. 17, 2013.

(51) Int. Cl.
| | |
|---|---|
| G06F 1/16 | (2006.01) |
| B65D 85/00 | (2006.01) |
| H04B 1/3888 | (2015.01) |
| H04M 1/18 | (2006.01) |

(52) U.S. Cl.
CPC ............ *G06F 1/1628* (2013.01); *H04B 1/3888* (2013.01); *H04M 1/185* (2013.01)

(58) Field of Classification Search
CPC ..................... G06F 1/1628; H04B 2001/3894; H04B 1/3888
USPC ............. 361/679.01–679.45, 679.55–679.56; 206/320
See application file for complete search history.

(56) References Cited

U.S. PATENT DOCUMENTS

| | | | | |
|---|---|---|---|---|
| 5,613,237 A * | 3/1997 | Bent | ...................... | H04B 1/086 220/4.02 |
| 7,230,823 B2 * | 6/2007 | Richardson | ........... | G06F 1/1626 220/23.91 |
| 8,251,210 B2 * | 8/2012 | Schmidt | .................. | H04M 1/04 206/320 |
| 8,995,126 B2 * | 3/2015 | Rayner | ................. | G06F 1/1656 277/644 |
| 9,025,317 B2 * | 5/2015 | Richardson | ......... | H04M 1/0252 361/679.01 |
| 2008/0081679 A1 * | 4/2008 | Kawasaki | ............ | H04B 1/3888 455/575.8 |
| 2009/0215412 A1 * | 8/2009 | Liu | ..................... | H04M 1/0249 455/90.3 |
| 2012/0118773 A1 * | 5/2012 | Rayner | ................. | G06F 1/1626 206/320 |
| 2012/0327565 A1 * | 12/2012 | Tages | .................. | B29C 45/1676 361/679.01 |
| 2014/0262847 A1 * | 9/2014 | Yang | ...................... | A45C 11/00 206/37 |

* cited by examiner

*Primary Examiner* — Nidhi Thaker

(57) ABSTRACT

A mobile device protecting structure includes a first frame having a first frame portion and a first guard plate, a second frame having a second frame portion and a fixing edge, and the second frame portion encircling the first frame portion, and a packing element disposed in the second frame portion and inserted into a packing slot formed at the exterior of the first frame portion, and a waterproof ring installed between the first and second frames and having an internal periphery. A mobile device is covered by the first and second frames, and a second guard plate is selectively packed between the internal periphery and the fixing edge or packed between the internal periphery and the mobile device depending on the thickness of the mobile device.

15 Claims, 7 Drawing Sheets

MOBILE DEVICE PROTECTING STRUCTURE

FIELD OF THE INVENTION

The present invention relates to a peripheral of a mobile device, and more particularly to a mobile device protecting structure.

BACKGROUND OF THE INVENTION

As electronic and communication industries are developed and integrated rapidly, many present electronic devices including tablet PCs or Smartphones are used and required extensively in various occasions. Therefore, products of this sort are usually designed with portable and mobile features to allow people to carry and use the products for different occasions in order to meet user requirements.

To cope with the situations in different environments when a mobile device is carried to a different place for its use and assure the safety of the normal operation of the mobile device, the mobile device is wrapped tightly for protection, so that the peripherals with the dustproof and waterproof effects are introduced into the market. Among these dustproof and waterproof peripherals, waterproof box is one having the greatest demand and capable of maintaining the normal operation or use of a mobile phone in water.

However, the conventional waterproof box requires a tight wrap to achieve the good waterproof effect, and thus such conventional waterproof box is limited by the shape and size of the mobile device. In other words, mobile devices of different models require waterproof boxes with different designs, and the universal applicability of the waterproof box is limited.

In view of the foregoing problems of the prior art, the inventor of the present invention based on years of experience in the related industry to conduct extensive researches and experiments and provided a feasible solution to overcome the problems of the prior art.

SUMMARY OF THE INVENTION

Therefore, it is a primary objective of the present invention to provide a mobile device protecting structure that is adjustable according to a different thickness of a mobile device to cope with the mobile device with the same shape and size, so that the protecting structure is applicable for diversified models or styles of the mobile devices instead of being limited to the application for only one model, while maintaining the good dustproof and waterproof effects of the protecting structure.

To achieve the aforementioned objective, the present invention provides a mobile device protecting structure provided for covering the exterior of a mobile device, and the mobile device has a first side, a second side facing the opposite side of the first side, and a side edge encircling between the first and second sides, and the protecting structure comprises: a first frame, having a first frame portion and a first guard plate, and a part of the first guard plate being disposed on the first frame portion, and the first frame portion encircling the side edge of the mobile device, and the first guard plate being stacked on the first side of the mobile device; a second frame, having a second frame portion and a fixing edge, and the second frame portion encircling an outer side of the first frame portion and having a packing element protruded from an inner side of the second frame portion, and the packing element being inserted into a packing slot formed on the outer side of the first frame portion, and the fixing edge being extended out from the inner periphery of the second frame portion towards the second side of the mobile device; and a waterproof ring, installed between the first and second frames, and having an internal periphery extending outwardly towards the second side of the mobile device, and the internal periphery being disposed between the second side and the fixing edge; wherein, the second side has a second guard plate stacked thereon, and the second guard plate is selectively packed between the internal periphery and the fixing edge or packed between the internal periphery and the second side of the mobile device, depending on the distance between the first side and the second side of the mobile device.

DESCRIPTION OF THE PREFERRED EMBODIMENTS

Figure 1:
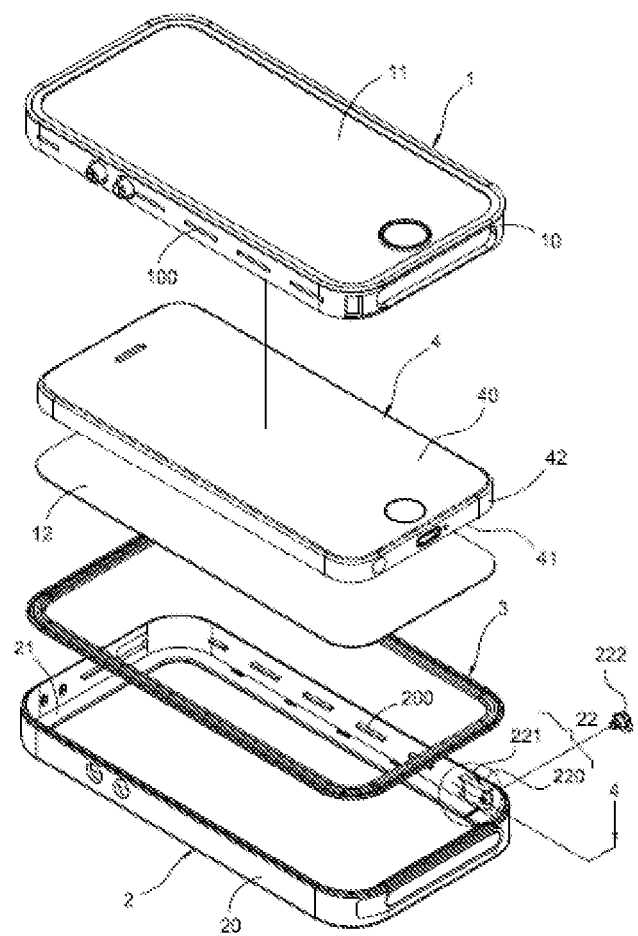
FIG. 1 is an exploded view of the present invention.

The technical contents of the present invention will become apparent with the detailed description of preferred embodiments accompanied with the illustration of related drawings as follows. It is noteworthy that same numerals are used for representing same respective elements in the drawings.

Figure 2:
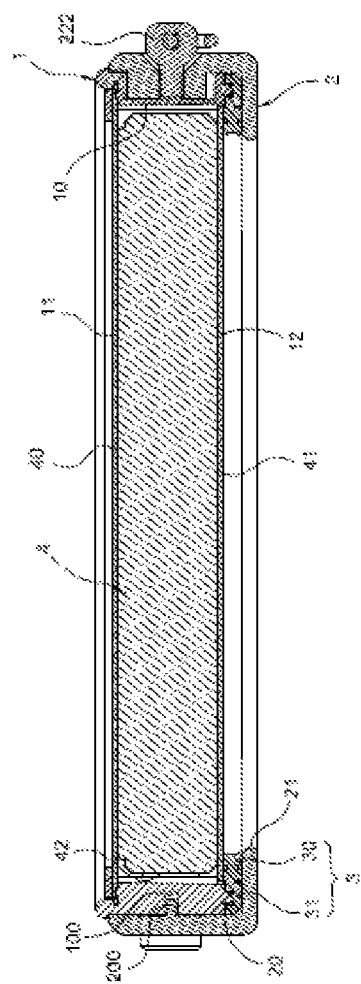
FIG. 2 is a cross-sectional view of the present invention.

With reference to FIGS. 1 and 2 for an exploded view and a cross-sectional view of the present invention respectively, the present invention provides a mobile device protecting structure for covering the exterior of a mobile device 4, and the mobile device 4 is a tablet PC, a smartphone, or any other portable electronic device, and the mobile device 4 has a first side 40, a second side 41 facing the opposite side of the first side 40, and a side edge 42 encircling between the first and second sides 40, 41. For instance, the first side 40 of the mobile device 4 is usually an operating side for operating the mobile device 4 by touching. The protecting structure comprises a first frame 1, a second frame 2, and a waterproof ring 3.

The first frame 1 is covered onto the first side 40 of the mobile device 4, and the first frame 1 has a first frame portion 10 and a first guard plate 11. The first frame portion 10 is made of an elastic material such as an impact-resistant buffer material and encircled around the exterior of the side edge 42 of the mobile device 4, and the first guard plate 11 is made of a transparent material and installed on the first frame portion 10 and partially combined with the first frame portion 10. The first guard plate 11 is stacked onto the first side 40 of the mobile device 4 and provided for a user to read the content displayed on the first side 40 through the first guard plate 11 made of the transparent material while operating the mobile device 4. In addition, the first frame portion 10 is integrally formed with the first guard plate 11 by an injection molding.

Figure 3:
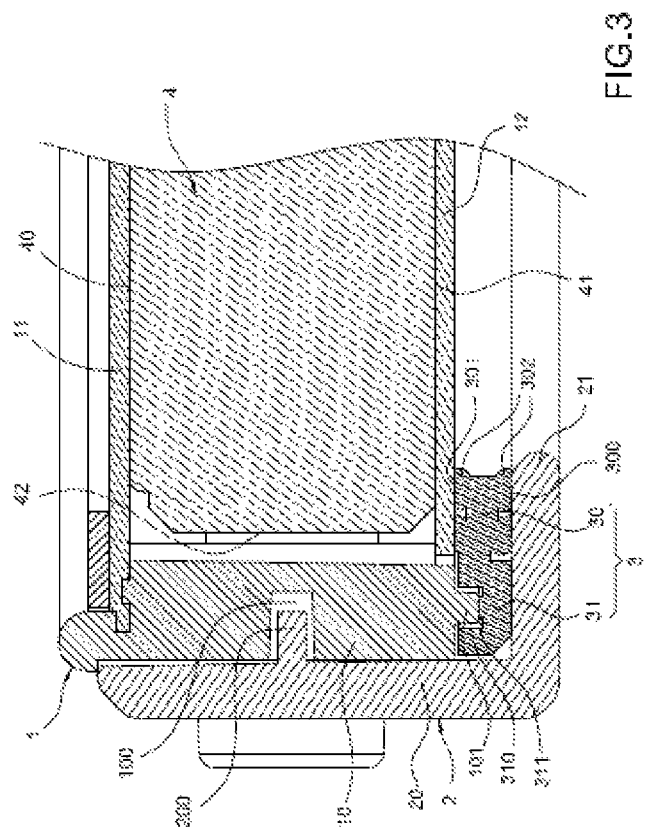
FIG. 3 is a partial cross-sectional blowup view of the present invention.

The second frame 2 is also made of an impact-resistant buffer material, and the second frame 2 has a second frame portion 20 and a fixing edge 21, and the second frame 2 together with the first frame 1 are covered onto the second side 41 of the mobile device 4. The second frame portion 20 of the second frame 2 encircles the outer side of the first frame portion 10 of the first frame 1, and a packing element 200 is protruded from an inner side of the second frame portion 20, and a packing slot 100 is formed on an outer side of the first frame portion 10 of the first frame 1 and provided for inserting the packing element 200 into the corresponding packing slot 100. In a preferred embodiment of the present invention, there are plural packing slots 100 disposed with an interval apart from one another and around the outer side of the first frame portion 10, and there are plural packing elements 200 disposed on the inner side of the second frame portion 20 and inserted into the packing slots 100 respectively, so as to provide the sealing effect between the first and second frame portions 10, 20. In FIGS. 2 and 3, the fixing edge 21 is extended outwardly from the internal periphery of the second frame portion 20 towards the second side 41 of the mobile device 4, so that the first and second frames 1, 2 jointly combine and cover the mobile device 4 from both directions of the first and second sides 40, 41.

Figure 4:
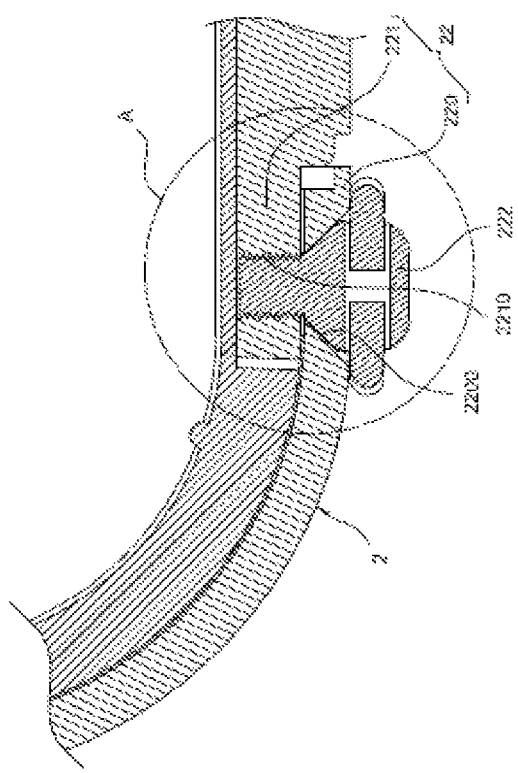
FIG. 4 is a cross-sectional blowup view of Section 4-4 of FIG. 1.

In FIGS. 1 and 4, the second frame portion 20 of the second frame 2 may have a cuttable portion 22 disposed thereon (as shown in Section A of FIG. 4) and a connectible structure 222 disposed on the cuttable portion 22 to facilitate the second frame 2 to be covered onto the first frame 1 during the assembling process, so that the second frame portion 20 is in a continuous surrounding form. Wherein the cuttable portion 22 has an upper connecting portion 220 and a lower connecting portion 221 formed on the second frame portion 20 and coupled to one another. Each of the upper and lower connecting portions 220, 221 has a screw hole 2200, 2210 formed thereon and stacked with each other, and the connectible structure 22 is a screw element such as a screw secured into the screw holes 2200, 2210 of the upper and lower connecting portion 220, 221, so that after the cuttable portion 22 is connected, the second frame portion 20 is in a continuous surrounding form.

In FIGS. 1 to 3, the waterproof ring 3 is made of a rubber material and installed between the first and second frames 1, 2. More specifically, the waterproof ring 3 is installed between the first frame portion 10 of the first frame 1 and the fixing edge 21 of the second frame 2 as shown in FIG. 3, and the waterproof ring 3 has an internal periphery 30 and an external periphery 31, and the internal periphery 30 is extended outwardly towards the second side 41 of the mobile device 4, and the internal periphery 30 is disposed between the second side 41 of the mobile device 4 and the fixing edge 21, and the external periphery 31 is packed between the first frame portion 10 and the fixing edge 21. In addition, the internal periphery 30 and the external periphery 31 of the waterproof ring 3 are arranged in step shape, wherein a recession 310 is formed at a position of the external periphery 31 and facing the first frame portion 10, and the first frame portion 10 has a protrusion 101 corresponding to the recession 310, and the recession 310 further includes at least one bump 311 formed therein and provided for contacting the protrusion 101, and the sealing effect between the first frame portion 10 and the fixing edge 21 is improved through the external periphery 31 of the waterproof ring 3.

Figure 5:
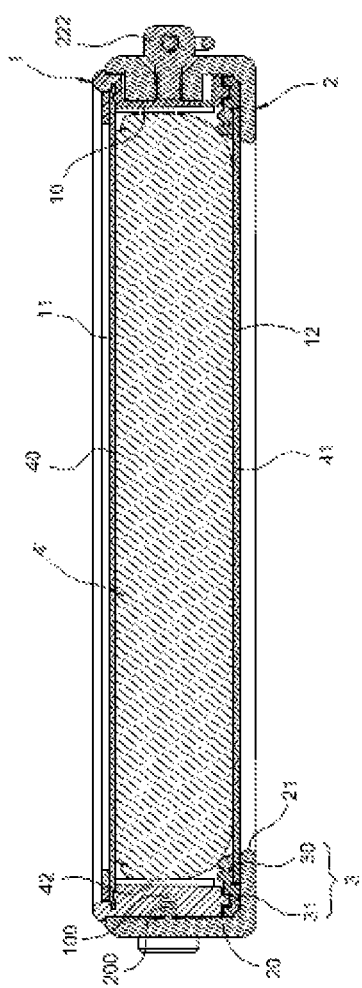
FIG. 5 is a cross-sectional view of another preferred embodiment of the present invention.
Figure 6:
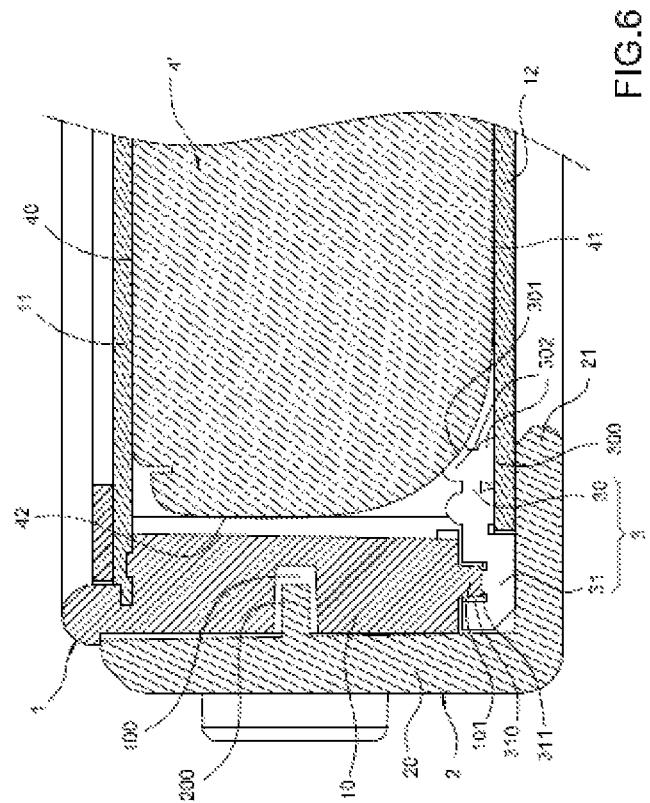
FIG. 6 is a partial cross-sectional exploded view of another preferred embodiment of the present invention.

The present invention may be adjusted to fit a mobile device 4 (or a mobile device 4' as shown in FIG. 5 or 6) with the same shape and size but a different thickness and characterized in that a second guard plate 12 is stacked onto the second side 41 of the mobile device 4, and the second guard plate 12 is made of a transparent material. To comply with the thickness of the mobile device 4, the second guard plate 12 is selectively packed between the internal periphery 30 of the waterproof ring 3 and the second side 41 of the mobile device 4 (as shown in FIG. 3), or packed between the internal periphery 30 of the waterproof ring 3 and the fixing edge 21 of the second frame 2 (as shown in FIG. 6). The thickness of the mobile device 4 is substantially equal to the distance between the first side 40 and the second side 41 of the mobile device 4. In this preferred embodiment, the mobile device 4 has a relatively smaller thickness, so that the second guard plate 12 is packed between the internal periphery 30 and the second side 41 of the mobile device 4 and stacked thereon.

In addition, the internal periphery 30 of the waterproof ring 3 has a first sealing surface 300 and a second sealing surface 301, and the first sealing surface 300 faces towards the fixing edge 21 of the second frame 2, and the second sealing surface 301 faces towards the second side 41 of the mobile device 4, and the first and second sealing surfaces 300, 301 have at least one bump 302 formed thereon for clamping and contacting the second guard plate 12.

With reference to FIGS. 5 and 6 for another preferred embodiment of the present invention, the mobile device 4' has a relatively greater thickness, so that the second guard plate 12 is packed between the internal periphery 30 and the fixing edge 21 and stacked onto the second side 41 of the mobile device 4. Obviously, the present invention can be adjusted to fit any mobile device 4, 4' with the same shape and size and a different thickness and used for diversified models or styles of the mobile devices, without being limited to the application for a single model only, while maintaining the good dustproof and waterproof effects.

Figure 7:
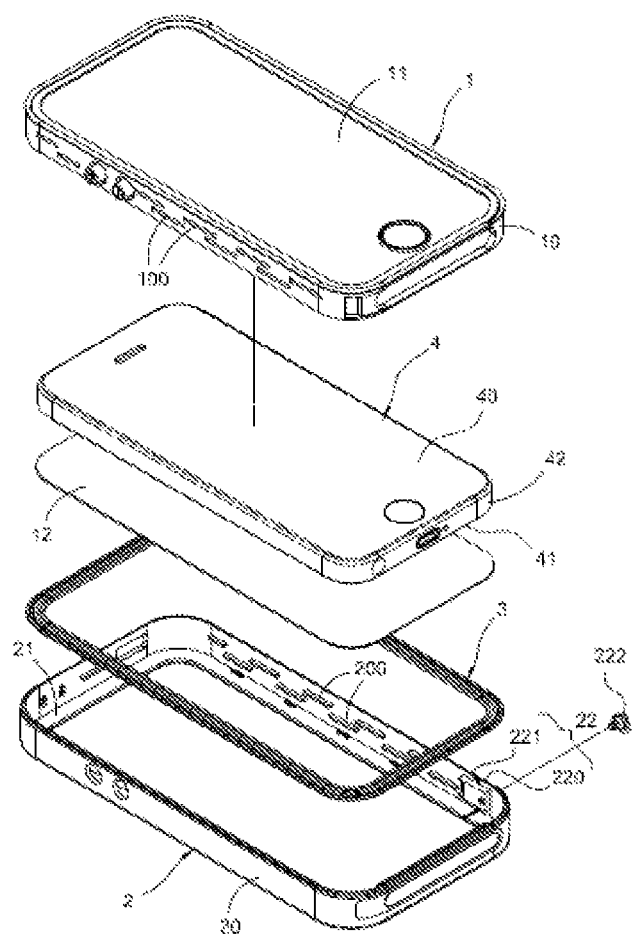
FIG. 7 is an exploded view of a further preferred embodiment of the present invention.

In FIG. 7, the packing slots 100 may be arranged alternately at the top and bottom and separated with an interval apart from each other in order to improve the contact between the first and second frame portions 10, 20, and the packing element 200 is arranged to fit each corresponding packing slot 100, so that more contact points can be achieved by means of the packing slot 100 and the packing element 200 to improve the sealing effect between the first and second frame portions 10, 20.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A mobile device protecting structure, for covering the exterior of a mobile device (i.e., mobile phone), and the mobile device having a first side, a second side facing the opposite side of the first side, and a side edge encircling between the first and second sides; the protecting structure comprising: a first frame, having a first frame portion and a first guard plate, and a part of the first guard plate being disposed on the first frame portion, and the first frame portion encircling the side edge of the mobile device, and the first guard plate being stacked on the first side of the mobile device, wherein a plurality of packing slots are disposed at a top and bottom of an outer side of the first frame portion with an interval apart from each other; a second frame, having a second frame portion and a fixing edge, and the second frame portion encircling the outer side of the first frame portion and having a plurality of packing elements protruded from an inner side of the second frame portion, the packing elements being inserted into the packing slots respectively, and the fixing edge being extended out from the inner periphery of the second frame portion towards the second side of the mobile device; and a waterproof ring, installed between the first and second frames, and having an internal periphery extending outwardly towards the second side of the mobile device, and the internal periphery being disposed between the second side and the fixing edge; wherein, the second side has a second guard plate stacked thereon, and the second guard plate is selectively packed between the internal periphery and the fixing edge or packed between the internal periphery and the second side of the mobile device, depending on the distance between the first side and the second side of the mobile device.

2. The mobile device protecting structure of claim 1, wherein the first frame portion of the first frame is made of an elastic material.

3. The mobile device protecting structure of claim 2, wherein the first frame portion of the first frame is integrally formed with the first guard plate by injection molding.

4. The mobile device protecting structure of claim 3, wherein the first guard plate is made of a transparent material.

5. The mobile device protecting structure of claim 1, wherein the second frame portion of the second frame has a cuttable portion disposed thereon, and a connectible structure disposed on the cuttable portion, so that the second frame portion is in a continuous surrounding form.

6. The mobile device protecting structure of claim 5, wherein the cuttable portion is disposed on the second frame portion to form an upper connecting portion and a lower connecting portion that are connectible to each other.

7. The mobile device protecting structure of claim 6, wherein the upper and lower connecting portions jointly define a screw hole, and the connectible structure is a screw element screwed into the screw hole.

8. The mobile device protecting structure of claim 7, wherein the screw element is a screw or a bolt.

9. The mobile device protecting structure of claim 1, wherein the waterproof ring further has an external periphery, and the external periphery is packed between the first frame portion and the fixing edge.

10. The mobile device protecting structure of claim 9, wherein the external periphery has a recession disposed at a position facing the first frame portion, and the first frame portion has a protrusion disposed in the corresponding recession.

11. The mobile device protecting structure of claim 10, wherein the recession has at least one bump for clamping and contacting a bump formed on the protrusion.

12. The mobile device protecting structure of claim 1, wherein both external periphery and internal periphery of the waterproof ring are arranged in step shape.

13. The mobile device protecting structure of claim 1, wherein the internal periphery has a first sealing surface and a second sealing surface, and the first sealing surface faces towards the fixing edge, and the second sealing surface faces towards the second side of the mobile device.

14. The mobile device protecting structure of claim 13, wherein the first and second sealing surfaces have at least one bump formed thereon separately and provided for clamping and contacting the second guard plate.

15. The mobile device protecting structure of claim 1, wherein the second guard plate is made of a transparent material.

* * * * *